PAIGE B. HOOPER
INVENTOR.

Dec. 8, 1970 P. B. HOOPER 3,545,865
SPECTROPOLARIMETER
Original Filed Feb. 11, 1969 3 Sheets-Sheet 2
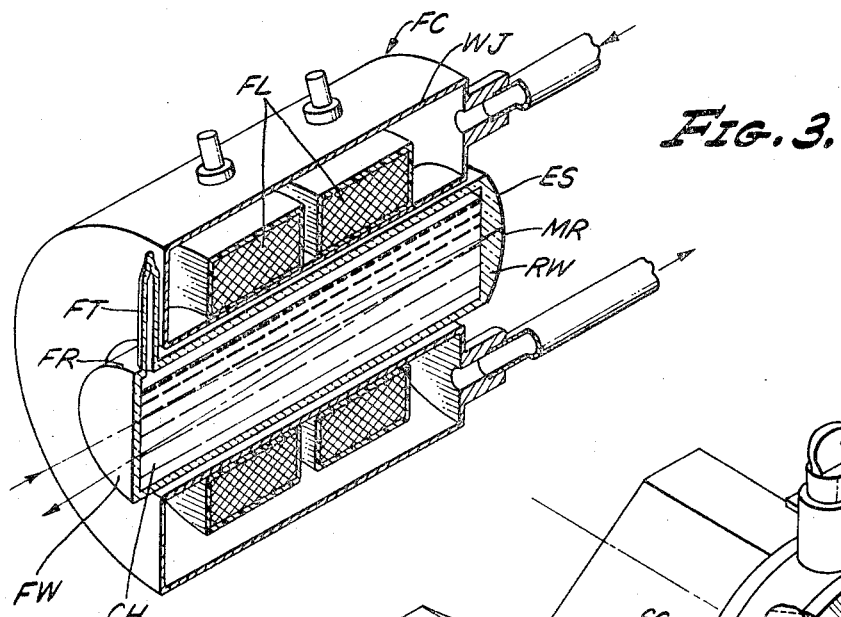
FIG. 3.
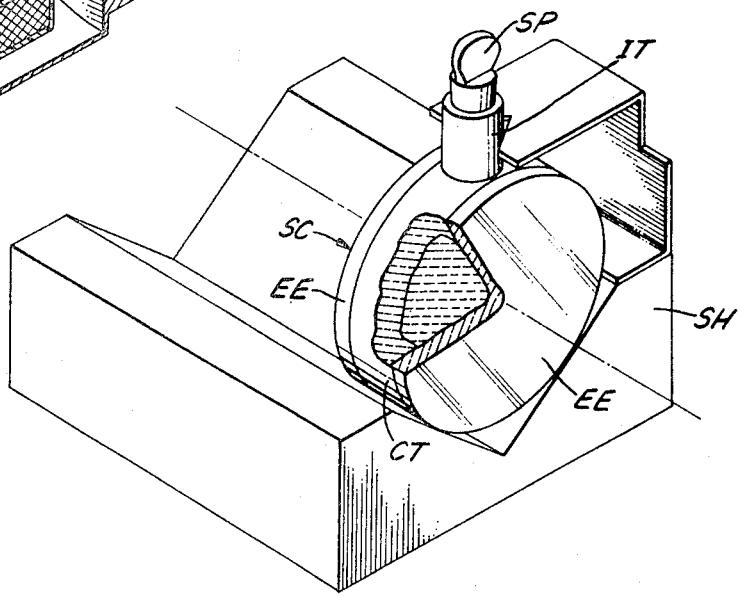
FIG. 4.
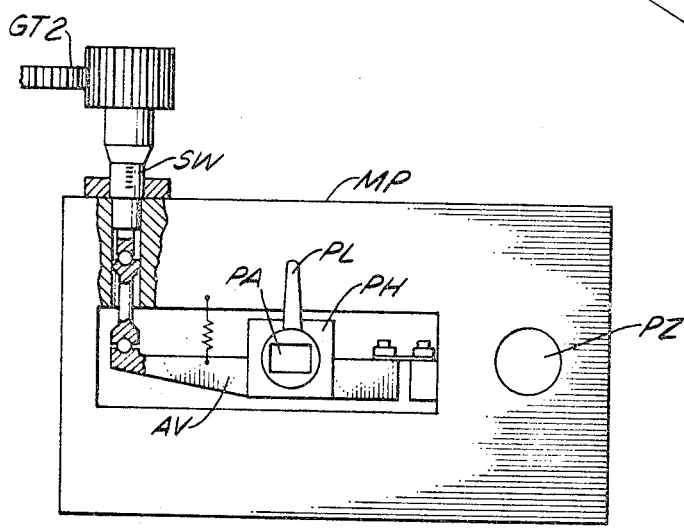
FIG. 5.
FIG. 2.
PAIGE B. HOOPER
INVENTOR.
BY
ATTORNEY

PAIGE B. HOOPER
INVENTOR.

United States Patent Office 3,545,865
Patented Dec. 8, 1970

3,545,865
SPECTROPOLARIMETER
Paige B. Hooper, 737 E. Dover,
Glendora, Calif. 91740
Continuation of application Ser. No. 800,040, Feb. 11,
1969. This application Nov. 10, 1969, Ser. No. 871,668
Int. Cl. G01n 21/44; G01j 3/00
U.S. Cl. 356—96
14 Claims

ABSTRACT OF THE DISCLOSURE

A spectropolarimeter is provided in which the distribution of a beam across a surface transverse to the optical path along which the beam travels does not depend upon the presence or absence of a sample. Two motor driven means intercoupled by a multipot are employed to change the wavelength setting of a monochromator and the widths of the monochromator slits to scan the spectrum and at the same time to control a characteristic, such as the intensity of the emerging monochromatic radiation. The distribution of the beam is reproducible from one run to another. Great accuracy in the measurement of optical activity as a function of wavelength, is achieved.

---

This invention relates to spectrometers and more particularly to improvements in spectropolarimeters that are employed for measuring effects of materials such as liquids and solids on polarized light. This application is a continuation of my prior application Serial No. 800,040 filed Feb. 11, 1969, and now abandoned, which in turn is a continuation of my prior application Ser. No. 348,348 filed Mar. 2, 1964 and also abandoned.

In a spectropolarimeter of the type to which this invention is particularly applicable, a specimen under investigation is located on a light path between a polarizer and analyzer. In addition, a Faraday cell that is subjected to the influence of an oscillating magnetic field is located on the path between the polarizer and the analyzer. In the prior art it has been common practice to locate the polarizer, the specimen, the Faraday cell, and the analyzer in a single straight optical path. In an improved polarimeter described and claimed in copending patent application Ser. No. 348,348, filed on Mar. 2, 1964, by Henry H. Cary, the polarizer and analyzer are mounted closely adjacent to each other and a mirror is incorporated in the Faraday cell to return radiation that has been transmitted through the polarizer to the analyzer. In either event monochromatic radiation is transmitted along that path through the polarizer, the specimen under investigation, the Faraday cell, and the analyzer to a photocell. In a spectropolarimeter the wavelength of the monochromatic radiation is varied during the course of the analysis.

The radiation that emerges from a polarizer or analyzer is polarized in a polarization plane that contains the optical path and the magnetic vector of the radiation. (Some authors treat the plane containing the electric vector as the plane of polarization. Other authors treat the plane that contains the magnetic vector as the plane of polarization.) A unit that is used as a polarizer can also be used as an analyzer. Accordingly, it will be understood that when reference is made to the properties of a polarizer per se, independently from its use in a polarimeter, an analyzer is to be considered as having the same properties.

Due to optical dissymmetry of molecules and crystals in a material under investigation, the polarization of light transmitted therethrough or reflected therefrom may be altered. Such alteration can occur in the material even though no magnetic or electric field or other field is applied thereto and special effects can occur when such fields are applied. Many of such effects can be studied and evaluated with a polarimeter. Examples of such optical dissymmetry effects are described below.

As plane polarized light from the polarizer is transmitted through the test specimen the polarization of the light incident on the specimen can be affected in many ways depending upon the properties of the material. Some materials exhibit optical activity. This name is applied to a material that rotates the plane of polarization of radiation transmitted therethrough ("optical rotation" or "circular birefringence"), while introducing some ellipticity of polarization ("Circular dichroism"). All materials have magneto optic properties. Such properties cause rotation of the plane of polarization in proportion to the intensity of a magnetic field applied to the specimen along the path of the radiation transmitted therethrough. This is known as the Faraday effect. All materials likewise exhibit a Cotton-Mouton effect. In this effect a magnetic field component transverse to the path of the radiation induces plane birefringence in the material, that is the velocity of propagation of plane polarized light is different depending on whether the polarization plane is parallel to or perpendicular to the component of a magnetic field that is normal to the light path. Some materials exhibit plane birefringence even in the absence of a magnetic field. Such materials cause the plane of polarization of a beam of radiation entering the material to be emitted from the material as an elliptically polarized beam, the major axis of the polarization ellipse being rotated relative to the polarization plane of the incident beam. The degree of ellipticity can vary from 0 to 1 depending upon the length and the orientation of the plane of polarization of the optical path in the specimen. Materials likewise exhibit a Kerr effect. These materials exhibit birefringence when an electrostatic field is applied to the material in a direction perpendicular to the optical axis. A polarimeter can be used in all of these cases and in others to measure certain of the effects that the materials have on polarized light. Such information is useful in the investigation of the properties and compositions of the materials under investigation. For convenience in this application, except where otherwise noted, it will be assumed that the specimen under investigation exhibits optical activity, that is, that the specimen is of such a nature that a beam of plane polarized light incident thereon is transmitted therethrough with a rotation of the plane of a polarization. In the case of elliptically polarized light the major axis of the polarization ellipse of the light leaving the sample is the "plane polarization." More particularly, when birefringence is produced by an optical element or specimen, plane polarized light that is transmitted therethrough is converted to elliptically polarized light. An elliptically polarized beam may be resolved into a circularly polarized component and a plane-polarized component. In the device described particularly herein, the circularly polarized component of the beam is not detected but the plane polarized component is detected. By suitable modification the circularly polarized component can be converted into a plane-polarized component and vice versa. For this reason the invention is not limited to the measurement of effects of specimens in rotating a plane-polarized beam but may be utilized in determining other effects which specimens have on a beam of polarized light.

When a specimen under investigation exhibiting optical activity is placed in the path of the beam, the plane of polarization rotates about the optical path. The magnetic vector is resolved into a component parallel to and a component transverse to the polarization plane of the analyzer. The analyzer transmits that part of the beam which corresponds to the parallel component of the magnetic vector. In practice where the specimen exhibits optical activity, the plane of polarization is rotated by an amount proportional to the distance traveled by the radiation in the sample. The amount of rotation or other effect that is produced also depends upon the wavelength of the radiation. The term "optical rotatory dispersion" is applied to the variation of circular birefringence, and therefore of optical rotation, with wavelength. In one type of spectropolarimeter, the Faraday cell is employed to introduce rotation of the plane of polarization in the opposite direction in order to compensate for the rotation produced by the specimen. In another type of polarimeter, the polarizer or the analyzer is rotated to compensate for the rotation introduced by the specimen. This invention is applicable to these and other types of spectropolarimeters.

In the particular type of spectropolarimeter described herein the polarizer and the analyzer are oriented in such angular positions about the optical axis, that light that is polarized by the polarizer is incident on the analyzer with the plane of polarization of the incident light perpendicular to the polarization plane of the analyzer thus resulting in a null or extinction condition.

A Faraday cell includes a Faraday coil wound on a Faraday core. The core is composed of a material which rotates the plane of polarization through an angle that depends on the strength and direction of the component of the magnetic field along the path of the beam. In such a cell the angle of rotation of the plane of polarization is proportional to the strength of the magnetic field along the axis of the core and in particular, therefore, is proportional to the current flowing through the coil. In the particular spectropolarimeter described herein, a sinusoidal alternating current of fundamental frequency is applied to the coil to cause the plane of polarization of radiation transmitted therethrough to oscillate about the plane of polarization of radiation directed thereinto-orentering thereinto. With this arrangement, an alternating current of fundamental frequency is generated in the photocell. The null or extinction condition is ascertained by adjusting conditions to reduce the current component of fundamental frequency in the output of the photocell to minimum or zero value.

In prior patent application, Ser. No. 772,992, filed by Henry H. Cary on Nov. 10, 1958, now Pat. No. 3,312,141 there was disclosed and claimed an improved polarimeter in which an AC current was applied to a Faraday cell to modulate or oscillate the plane of polarization at the analyzer and in which a DC current was applied to the Faraday cell to vary the average angle of rotation introduced by the Faraday cell. Such modulated rotation produces an alternating current in the photocell and this current is measured and is utilized to vary the DC current to produce the desired compensation. In other words, with such a system when a specimen is placed in the polarimeter, the AC current modulates the amount of radiation falling on the photodetector, and the DC current is varied in order to adjust the amplitude of the fundamental component of the AC current from the photocell to a minimum or zero value to indicate when the polarizer, the sample cell, the Faraday cell, and the analyzer are in their extinction position.

It is extremely important in modern technology to be able to measure the optical rotation of a specimen to a very small angle, in fact to an accuracy of 0.001° and even smaller. By measuring the optical rotatory power of a specimen to such small angles at various wavelengths over a wide range of wavelengths, information is obtained regarding the molecular structure of the specimen under investigation and also regarding the concentrations of various components in that specimen, if it is a mixture. Such information is valuable both for scientific purposes and for industrial purposes.

While the invention is applicable to a spectropolarimeter in which the compensation of optical rotation is produced by adjustment of a DC current, it is especially applicable to a spectropolarimeter of the type in which the optical rotation produced by the sample cell is compensated by rotation of either the polarizer or the analyzer. The rotation of the polarizer to produce the desired compensation is particularly desirable in spectropolarimetery, since the amount of optical rotation produced by applying a particular DC current to a Faraday coil varies with wavelength. On the other hand the plane of polarization of many polarizers and analyzers is completely independent of wavelength, at least throughout very wide ranges.

In a monochromator the resolving power and light transmission may be varied in different ways. The simplest way is to adjust the width of one or more of the slits through which the radiation is transmitted. When the slit width varies, the light transmission and the light grasp vary. The resolving power at any particular wavelength also varies. The term light grasp is a technical term that refers to the size of the beam as defined by the aperture stops which limit the cross-section of the beam in one direction or another transversely of the beam at various points along the length of the beam. Usually, when the resolving power or light transmission efficiency of the monochromator is to be varied as a function of wavelength, this is done by varying the width of the entrance slit or the exit slit or both.

In certain applications of polarimeters it is desirable to maintain the resolving power uniform throughout the wavelength range over which the measurements are being made. In other applications the resolving power $d\lambda/\lambda$ is permitted to vary over the spectrum under investigation. The resolving power is the ratio of the band width $d\lambda$ of the radiation being emitted from the monochromator divided by the wavelength $\lambda$ at the center of the band. In other words, the resolving power is $d\lambda/\lambda$. For this purpose $d\lambda$ is sometimes taken as the separation between the two wavelengths of the spectral band emitted by the monochromator at which the intensity per unit wavelength is 50% of the maximum intensity in the band. However, it may be measured in other ways as may be convenient.

In some applications it is desirable to vary the light grasp of the spectrophotometer in order to establish the intensity of the radiation being emitted from the monochromator to desired levels at different wavelengths. For example, if a high temperature light source that emits white radiation is used as the source of light for the monochromator, the intensity of the radiation in a given band width is higher at long wavelengths and lower at short wavelengths. Accordingly, it is desirable to employ a relatively large value of light grasp to establish a high light transmission efficiency at short wavelengths and a relatively low value of light grasp to establish a low light transmission efficiency at long wavelengths.

In a monochromator the resolving power may be varied in different ways. The simplest way to vary the resolving power is to adjust the width of one or more of the slits through which the radiation is transmitted. More broadly, it is the "light grasp" of the monochromator that is varied. The term light graps is a technical term that refers to the size of the beam as defined by the aperture stops which limit the cross-section of the beam in one direction or another transversely of the beam at various points along the length of the beam. The light grasp of the beam is set at different values at different wavelengths in order to establish the resolving power or light transmission efficiency of the monochromator at those wavelengths. This is usually done by varying the width of the entrance slit or the exit slit or both.

In any event, when the light grasp is varied serious difficulties are encountered in a spectropolarimeter by virtue of the fact that the beam being transmitted through the spectropolarimeter changes in dimensions at various parts thereby bringing into use different parts of the optical elements including the lenses, the polarizer, the sample cell, the Faraday cell, and the analyzer. Furthermore, when the light grasp is varied, the angle at which various portions of the beam are incident on such optical elements also varies. As a result of such changes in angle of incidence, the position of the polarization plane of the beam may be altered, thereby changing the relative positions required of the polarizer and analyzer to produce extinction. This introduces spurious indications of the amount of optical activity of the sample under investigation.

In order to minimize the effects of errors from this source, this invention provides for varying the light grasp of a monochromator as a reproducible function of the wavelength during the scanning of the spectrum. Consequently, the error introduced at any wavelength is the same from one time to another. By reproducibly varying the light grasp of the monochromator as a function of wavelength during the scanning from one time to another, errors, caused by variation in the light grasp as a function of wavelength are themselves reproducible. By rendering such errors reproducible they may be measued at the various wavelengths and such reproducible errors can therefore be taken into account and corrections made therefor. In the best mode of practicing the invention that has been devised up to the present time the width of the entrance slit and the width of the exit slit of the monochromator are varied in synchronism with each other and this variation is achieved in a reproducible way by means of a mechanism that is controlled by the scanning motor. In the best embodiment of the invention that has been employed, these results are achieved by setting the widths of the slits by means of a servomotor and cam mechanism and by controlling the servomotor from an electric circuit operated by the scanning motor. The various details of the system for accomplishing this result are described hereinafter in connection with the accompanying drawings in which:

FIG. 2 is an elevation view of a dispersing prism showing an aperture-stop defining mask;

FIG. 3 is a cross-sectional view of a water-cooled Faraday cell employing water as the core material;

FIG. 4 is an isometric view of a sample cell, together with support;

FIG. 5 is a detailed diagram of a type of mounting that may be employed with a rotatable polarizer;

Figure 1:
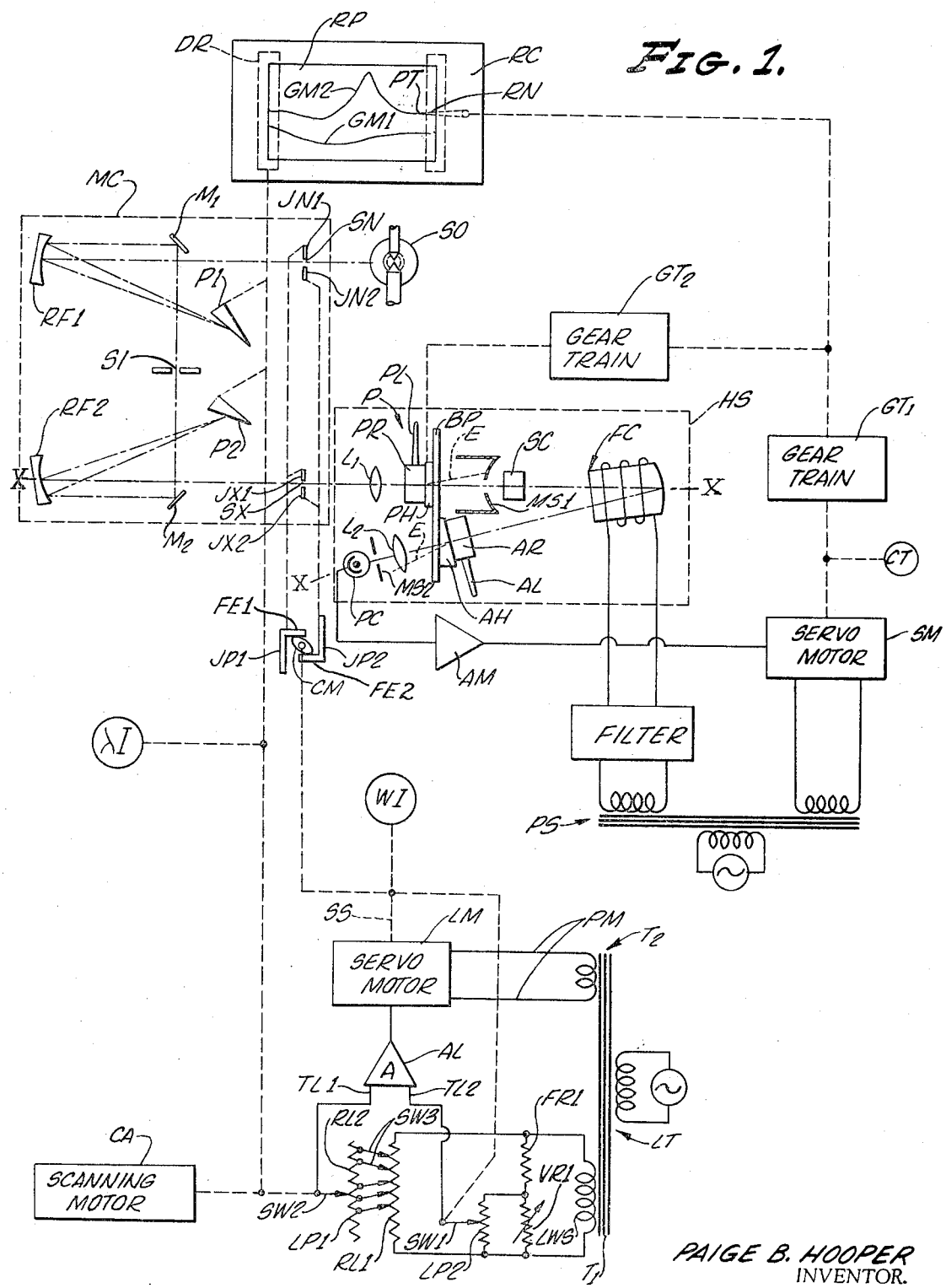
FIG. 1 is a schematic diagram of a spectropolarimeter embodying this invention.

In the spectropolarimeter illustrated in FIG. 1 white light from an intense source SO, such as a Xenon arc lamp, enters a monochromator MC where it is dispersed spectrally so that a portion of the light in a narrow wavelength band is emitted from the monochromator. This emitted radiation is transmitted along an optical axis X—X through the polarimeter unit P. In the polarimeter unit light travelling along the axis X—X passes through a first lens $L_1$, a polarizer PR, a sample cell SC, a modulator Faraday cell FC, an analyzer AR and a second lens $L_2$ to a photocell PC, all of which elements are mounted in a common light-tight housing HS. The polarimeter of FIG. 1 is of the extinction type. By this is meant that the plane of polarization of the beam that is incident on the analyzer AR after passage through the polarizer PR and the sample cell SC and the Faraday cell FC is perpendicular to the polarization plane of the analyzer thus minimizing the amount of light striking the photocell PC. In the spectropolarimeter illustrated, the polarizer PR and the analyzer AR are rigidly mounted on a common floating baseplate BP in close juxtaposition to each other and the Faraday cell FC is provided with a mirror at one end thereof for reflecting to the analyzer the light that has been transmitted into the Faraday cell from the polarizer, as taught in copending patent application Ser. No. 348,348, filed on Mar, 2, 1964, by Henry H. Cary.

The monochromator MC is a double monochromator. The monochromator comprises an entrance slit SN into which radiation from the source SO is directed. This radiation is separated into its spectral components by means of a pair of dispersing prisms $P_1$ and $P_2$ thereby causing a spectrum of the radiation to be formed within the monochromator MC adjacent the exit slit SX.

White light entering the entrance slit SN is directed to a first collimating mirror RF1 which reflects the radiation to the first dispersing prism $P_1$ which in turn returns dispersed radiation to the first collimating mirror RF1 and thence to the first flat mirror $M_1$ which in turn directs the focused spectrum of the radiation at an intermediate slit SI. The radiation that lies in a narrow band of wavelengths and that is transmitted through the intermediate slit SI is reflected by a second flat mirror $M_2$ to a second collimating mirror RF2 to the second dispersing prism $P_2$ which in turn disperses the radiation further and reflects the dispersed radiation to the collmating mirror RF2 which in turn focuses a spectrum of the radiation at the exit slit SX, thus causing monochromatic radiation of high purity to emerge from the exit slit SX along the optical axis X—X. A scanning motor CA coupled to the prisms $P_1$ and $P_2$ by means of cams causes the spectrum to be scanned by the exit slit SX and thus to change the wavelength of the emitted monochromatic radiation. The shape or grasp of the monochromatic beam that is emitted is defined by an aperture stop formed by a mask MK on the second prism $P_2$ (see FIG. 2) and by the aperture stop formed by the exit slit SX. In other words, the monochromatic radiation that is available for use by the polarimeter unit P is defined by a somewhat conically shaped beam within the monochromator having at one end a base formed by the virtual image of the opening in the mask MK formed behind the second collimating mirror RF2 and having at the other end a peak defined by the narrow rectangular slit SX. One quantity which is very useful in describing the light transmission properties of the monochromator is the light grasp, which is defined mathematically as follows:

$$G = n^2 \frac{A_1 A_2}{L^2}$$

where
$A_1$ = cross-sectional area of beam at one aperture stop. In this case the exit slit SX.
$A_2$ = cross-sectional area of beam at the other aperture stop, in this case the virtual image of the stop defined by a mask MK on the dispersing prism.
$L$ = distance between the aperture stops.
$n$ = effective index of refraction between the aperture stops.

The manner in which the light grasp is varied during the scanning of the spectrum is explained in detail hereinafter.

As indicated in FIG. 3 the Faraday cell FC includes a water filled chamber CH having a plane parallel transparent front wall or window FW and a rear wall RW that has a flat interior surface and a spherical exterior surface ES. The rear wall RW has a mirror MR formed by a reflecting coating deposited on its exterior surface ES. Thus, in effect, the Faraday cell FC acts as a focusing element. A filler tube FT extends upwardly from the chamber CH. In the specific embodiment of the invention described, the chamber CH is filled with water, leaving a small gas space in the filler tube FT and in the upper portion of the chamber CH to accommodate expansion and contraction caused by temperature changes. The water filled chamber CH constitutes a Faraday core FR. The Faraday coil FL in this case consists of a pair of annular windings mounted within an annular water jacket WJ and concentrically with the core FR. Excessive heating of the Faraday cell otherwise caused by electric power that is dissipated in the coil is prevented by constantly flowing cooling water through the water jacket while the cell is in use.

In the spectropolarimeter of FIG. 1, the first lens $L_1$ forms a real image of the aperture stop within the sample cell SC and an image of the monochromator exit slit SX at infinity. The mirror MR of the Faraday cell FC forms a real image of the exit slit SX between the Faraday cell and lens $L_2$. The mirror MR also forms a virtual image of the aperture stop to the left of the sample cell SC. The second lens $L_2$ forms a real image of the aperture stop at the photocell PC. The principles by means of which the focal lengths of the lenses $L_1$ and $L_2$ and the focusing mirror MR are designed and the principles by means of which the various parts of the polarimeter can be spaced along the optical axis X—X relative to each other to cause the various images to be formed at specified locations are well known in the art and need not be described herein.

The sample cell SC is located on the branch of the optical axis X—X between the polarizer PR and the Faraday cell FC.

The polarizer PR and the analyzer AR may be of conventional type such as a Senarmont of a Rochon prism AR and (see FIG. 5) PR. Each of these prisms permits an ordinary ray to be transmitted along a straight line therethrough but causes an extraordinary ray E (see FIG. 1) to be deflected from that straight path. The planes of polarization of the ordinary and extraordinary rays are perpendicular to each other. The plane of polarization of the ordinary ray is here referred to as the plane of polarization of the polarizer PR or the analyzer AR as the case may be. A black mask MS1 mounted within the housing HS is employed to absorb the extraordinary ray passing through the polarizer PR. Likewise, an apertured mask MS2 is employed to permit only the ordinary ray passing through the analyzer AR to be transmitted to the photocell PC.

Both the polarizer PR and the analyzer AR are rotatably mounted in corresponding housing PH and AH which are mounted upon a common base plate BP as shown in FIG. 5. Both the polarizer PR and the analyzer AR can be rotated on the respective housings and set in fixed positions in those housings by manipulation of levers PL and AL attached thereto. The housing AH in which the analyzer AR is mounted is fixed on the plate BP. However, the housing PH in which the polarizer PR is mounted is in turn mounted on a lever which is pivotally attached by means of a spring on the plate BP. This lever AV is rotatable about its pivot through the action of a gear train GT2 that actuates a screw SW engaging the end of the lever remote from its pivot.

To prepare the polarizer for use, monochromatic radiation is projected into the polarizer unit P from the monochromator without a sample in place and the polarizer PR is set for maximum light transmission from the monochromator and the analyzer AR is adjusted in its housing to produce an extinction condition while the lever AV is located at a point in the mid-range of its angle of rotation. To achieve this result, the polarizer PR can be removed temporarily and the analyzer AR rotated in its housing to produce a minimum current of fundamental frequency in the photocell PC. In this operation advantage is taken of the fact that the radiation emitted from the monochromator MC is itself polarized by virtue of the action of the dispersing prisms $P_1$ and $P_2$. After the analyzer AR has been set in such position, the polarizer PR is then replaced and is rotated to set it in such position that the polarized radiation transmitted through the polarizer PR is extinguished by the analyzer AR. In this condition, the plane of polarization of the polarizer PR is parallel to the polarization plane of the radiation emited from the monochromator, thus attaining most effective use of the radiation emitted from the monochromator.

Thereafter, when a sample is placed in the sample cell, the screw SW is operated automatically in response to the output of the photocell PC as explained hereinafter to rotate the polarizer PR through an angle equal and opposite to the angle through which the sample rotates the polarized beam.

As indicated in FIG. 4, the sample cell SC is of cylindrical configuration consisting of a cylindrical tubular member CT and two flat endwalls EE, EE. Each of the endwalls is in the form of a flat plate having parallel surfaces. A vertical inlet tube IT, and stopper SP are provided to permit changing liquid samples. A suitable sample holder SH is mounted in the housing HS to facilitate mounting the sample chamber SC in place in a repeatable manner.

In the specific embodiment of the invention illustrated herein, alternating current of fixed fundamental frequency is supplied to the Faraday coil from a power source PS, thus causing the magnetic field along the axis of the Faraday core FR to reverse alternately, varying in intensity in a sinusoidal manner. When this occurs, the alternating magnetic field causes the plane of polarization of the light that is transmitted from the sample to the reflecting mirror MR and thence to the analyzer AR to be oscillated about the axis of the beam in a similar almost sinusoidal manner. As a result, even when the average position of the beam striking the analyzer AR is perpendicular to the plane of polarization of the analyzer AR, an alternating current is generated in the photocell PC. In practice, a photomultiplier is used as the photocell PC.

It can be shown that at least for small angles of rotation of the plane of polarization incident on the analyzer AR, the component of the alternating current generated by the photocell which is of fundamental frequency, has an amplitude that is proportional to the deviation of the polarization plane from the extinction position and a polarity or phase that depends upon the direction of such deviation from the extinction position.

In the spectropolarimeter of this invention the current developed by the photocell PC is selectively amplified by a tuned amplifier AM to amplify the AC current component of fundamental frequency. This amplified current is applied to a servomotor SM which operates through a first gear train $GT_1$ to operate a pen recorder RC and through an additional gear train $GT_2$ to operate the screw SW in such a way as to restore the plane of polarization incident upon the analyzer AR to its extinction position.

In the spectropolarimeter of this invention the wavelength of the radiation emitted from the monochromator MC is varied during an analysis of a specimen by operation of the scanning motor CA and the light grasp of the monochromator is varied as a predetermined function of the wavelength.

In the monochromator MC the entrance slit SN and the ext slit SX are each defined by a pair of slit jaws JN1, JN2 and JX1 and JX2. The two jaws JN1 and JX1 on one side of each of the slits SN and SX respectively, are formed by parallel edges of a common plate JP1. Similarly, the two jaws JN2 and JX2 on one side of each of the slits SN and SX respectively, are formed by parallel edges of a common plate JP2. Means including a cam CM engaging parallel follower elements FE1 and FE2 on the respective plates JP1 and JP2 are employed for adjusting the slit widths. The spacing of the pair of jaws JN1 and JX1 on the plate JP1 is equal to the spacing between the jaws JN2 and JX2 of the plate JP2 so that the two slits SN and SX always have the same widths. A slit width adjusting mechanism of this type is described and claimed in Pat. No. 3,098,408 that issued to Henry H. Cary on July 23, 1963.

According to the present invention the cam CM is coupled to the servomotor LM in such a way that the widths of the slits SN and SX are varied synchronously during the scanning of the spectrum in accordance with a predetermined and reproducible function of the wavelength of the radiation emitted from the monochromator MC. In the embodiment of the invention illustrated in FIG. 1 the cam CM is mounted on the output shaft SS of the servomotor LM. This motor is suppled with power from the power mains PM and also with power from the output of a differential amplifier AL. One input terminal TL1 is supplied with an AC voltage from a potentiometer LP1 driven by the scanning motor CA and the outer input terminal TL2 is supplied with an AC voltage from a potentiometer LP2 driven by the servomotor LM. In this invention a voltage is developed on the potentiometer LP1 of a value which will cause the servomotor to set the widths of the respective slits SN and SX at a predetermined value at each wavelength and the servomotor LM cooperates with the potentiometer LP2 to cause the widths of the slits to assume that value automatically as required.

More particularly, the slit width control poteniometer LP1 is of the so-called multipot type. It includes a plurality of potentiometer windings RL1 connected across the secondary winding LWS of a transformer LT. The multipot unit LP1 also includes a second potentiometer winding RL2. A single slidewire SW2 coupled to the output shaft of the scanning motor CA engages the second potentiometer winding RL2 and is moved along the length thereof from one end thereof to the other automatically while the scanning motor CA rotates the dispersing prisms $P_1$ and $P_2$ of the monochromator MC. A plurality of slidewires SW3 are connected to fixed taps on the potentiometer winding RL2 and are movable along the length of the other potentiometer winding RL1. The slidewires SW3 are set at positions on the potentiometer winding RL1 suitable for causing voltages at corresponding taps on the potentiometer winding RL2 to correspond to the desired slit widths at the various wavelengths to which the position of the slidewire SW2 corresponds during the scanning. In practice, instead of employing a single winding RL1, a plurality of such windings are connected in parallel and a separate slidewire SW3 is associated with each, all as is well known in the art.

The second potentiometer LP2 is shunted by a variable resistor VR1 which is connected in series with a fixed resistor FR1 across the secondary winding LWS. The slidewire SW1 associated with the potentiometer LP2 is connected mechanically to the output shaft SS of the servomotor LM. As a result, a voltage is developed at the slidewire SW1 corresponding to the angular position of the shaft SS.

In operation, as the scanning motor CA rotates the prisms P1 and P2 to cause the wavelength of the radiation emitted from the exit slit SX to vary, the scanning motor moves the slidewire SW2 along the length of the potentiometer winding RL2 thereby causing a variable voltage to be applied to the input terminal TL1 of the differential amplifier AL. Simultaneously a voltage is applied to the second input terminal TL2 of the differential amplifier AL from the slidewire SW1 of the potentiometer LP2. If the voltages of the two inputs TL1 and TL2 are equal the servomotor LM remains at rest. But if they are different the servomotor LM rotates at a speed dependent upon the difference and in a direction depending upon the polarity, or phase, of the difference. Power is supplied to the servomotor from the transformer $T_2$ with such a phase as to rotate the shaft SS in a direction to change the slit width in an appropriate direction. Simultaneously, the shaft moves the slidewire SW1 to reduce the difference in voltages applied to the two input terminals TL1 and TL2 so that when the width of the slits has been adjusted by the servomotor to a value corresponding to the potential applied to the input terminal TL1 an equal voltage will be applied to the input terminal TL2 bringing the servomotor to rest.

In connection with the foregoing discussion it is to be borne in mind that there are numerous types of servomotors which may be employed for this purpose. In one type the servomotor is provided with a rotor winding and a stator winding. In one type of such servomotor, the stator winding is provided with shaded poles so that when AC current is applied to the winding, it creates a rotating magnetic field in the space in which the rotor is located, causing the rotor to rotate in one direction or the other, according to the phase of the AC current applied to the rotor. Thus, for example, the rotor winding can be supplied with power from a power transformer $T_2$ and the shaded-pole stator winding can be supplied with power from the output of the differential amplifier AL. By employing a common core for the two transformers $T_1$ and $T_2$, and properly phasing the secondary windings, the servomotor operates to set the slit width at the desired point corresponding to the position of the slidewire SW1 on the potentiometer LP2. If there is any error in the phasing of the secondary windings, this can be corrected by reversing the connections of one secondary winding or the other to the circuit to which it is connected.

With the multipot arrangement the slidewires SW3 are set at such positions that the width of the slit will have predetermined values at a series of wavelengths throughout the wavelength range of the spectrum in which the analysis is being made. In order to match a predetermined set of specifications for variation of slit width with wavelength, a large number of slit width slidewires SW3 are employed. For example, in order to set the wavelength of the slit width accurately at a large number of wavelengths throughout the range from say 2500 A. to about 6000 A. thirty such slit width slidewires are employed. To aid in scheduling the variations in control voltage applied to the slidewire SW2 a slit width indicator WI is connected to the output shaft SS of the servomotor. A wavelength indicator λI is also coupled to the shaft of the scanning motor. With this arrangement, the scanning motor may be operated as by manipulation of a switch (not shown) to set the monochromator at a succession of wavelengths indicated by the wavelength indicator λI one at a time. As this is done the slidewire SW1 is set automatically at a corresponding series of positions along the length of the potentiometer winding RL2. The slidewire SW3 closest to that position is then moved along the length of the potentiometer winding RL1 to such a position that the slit width has a desired value as indicated by the slit width indicator WI. This process is repeated for successive wavelengths and is then repeated for the entire spectrum a number of times until the slit width varies with wavelength in the manner desired. Usually two repetitions in settings are sufficient.

Figure 6:
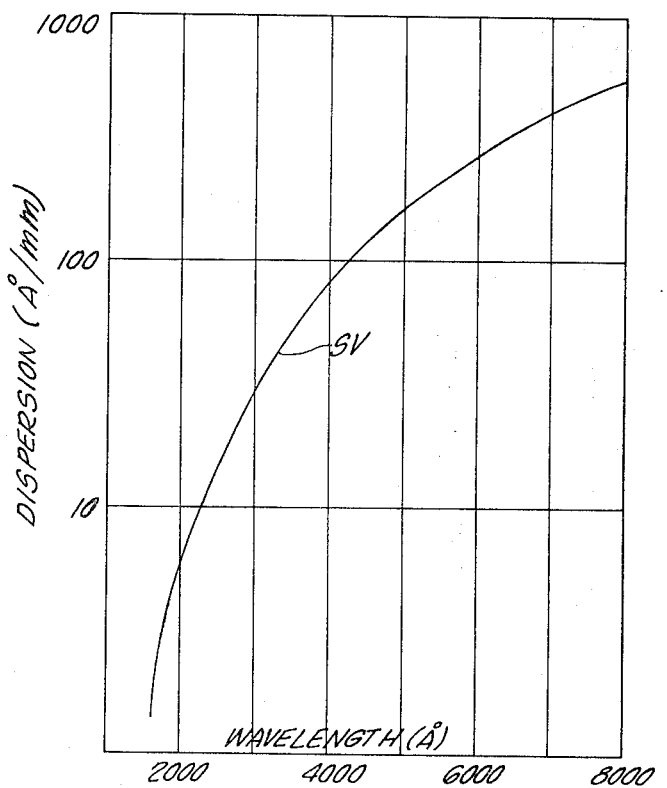
FIG. 6 represents a dispersion curve of the monochromator.

As mentioned previously, the slit width may be scheduled to vary as a predetermined function of wavelength in accordance with different requirements. For example, it may be scheduled to vary in such a way as to maintain the resolving power of the instrument substantially constant over the wavelength range mentioned in accordance with the dispersion characteristics of the instrument. One way to do this is to make use of a dispersion curve such as that shown in FIG. 6. The ordinate of this dispersion curve represents the reciprocal dispersion $d\lambda/dx$ in A./mm. at the wavelengths indicated by the abscissa. This is the reciprocal dispersion in terms of the wavelength emitted from the monochromator at the time that the dispersion is measured. In other words each point on the dispersion curve SV represents the width $d\lambda$ of the spectrum of the radiation emitted from the monochromator at each corresponding wavelength at which the monochromator is set with the width of the slit at 1 mm. Thus, when radiation of 3000 A. is being emitted through the exit slit SX the difference in the wavelength of radiation in the spectrum at points separated by distance of 1 mm. at the exit slit is 30 A. Similarly, when the monochromator is emitting radiation having a wavelength of 6000 A., the difference in wavelength between radiation at points spaced 1 mm. apart at the exit slit is 243 A.

In order to provide uniform dispersion throughout the spectrum, the slit width is set at a value at each wavelength at a width that is inversely proportional to the dispersion. Thus, for example, if settings are being made at the two wavelengths 3000 A. and at 6000 A., the widths that the slits have at those wavelengths are made inversely proportion to 30 and 243 respectively. To make such settings, the slit width is first set at an arbitrary value at a wavelength such as 3000 A. where the intensity of the radiation is weak so that measurements may be made at that wavelength. This setting is made by manipulating the slidewire SW3 that is connected to the potentiometer RL2 at a point thereof that is close to the slidewire SW2 while the monochromator is emitting monochromatic radiation having a wavelength of 3000 A. The slit width at that wavelength is read off the slit width indicator WI. Then the monochromator is set at successively different wavelengths and the slit widths required to produce uniform dispersion at those wavelengths are then established by setting of the remaining slidewires SW3.

When the slidewires SW3 have been adjusted as desired, the scanning motor CA is first operated to produce a spectrogram corresponding to a blank sample cell SC or to a reference specimen placed in the sample cell and the process is then repeated with a test sample in place in the sample cell. In either event, as the scanning motor CA causes the spectrum to be scanned by the exit slit SX by sweeping the spectrum past the exit slit, the width of the exit slit is changed automatically in accordance with the function established by the setting of the slit width control unit. At each wavelength the radiation emitted from the monochromator passes through the polarizer PR through the sample cell SC into the Faraday cell FC and then by reflection to the analyzer AR. The scanning occurs sufficiently slowly to permit the servomotor LM to rotate the polarizer PR to produce extinction at each wavelength during the scanning. Thus, as the spectrum is scanned, the polarimeter is automatically maintained in a succession of extinction conditions corresponding to various wavelengths through the spectrum.

With this spectropolarimeter, a record is made automatically during the scanning of the spectrum for automatically plotting the rotation of the analyzer AR as a function of wavelength. To this end, the recorder RC is employed. This recorder includes a drum DR driven by the scanning motor CA to pull a strip of recording paper RP past a recording pen RN at a speed proportional to the change in wavelength. Simultaneously, the recording pen RN is operated by the servomotor SM through the gear train $GT_1$ to displace its recording points PT from a reference position by an amount that is proportional to the angle of rotation of the polarizer PR. Such a spectrum is obtained both for the blank sample cell or for a reference sample and also for the sample under test.

Figure 7:
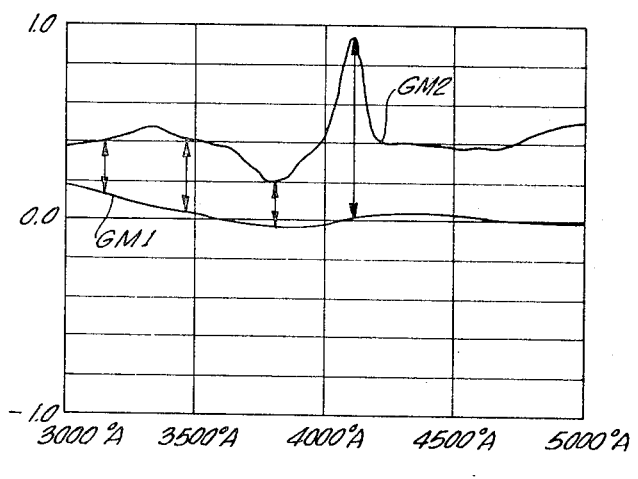
FIG. 7 represents a spectropolarogram obtained in accordance with this invention.

FIG. 7 illustrates two spectropolarograms $GM_1$ and $GM_2$. The first polarogram $GM_1$ is a record of the manner in which the polarizer PR rotates as the wavelength is changed, to produce extinction, while the sample cell is blank. The second polarogram $GM_2$ is a record of the manner in which the polarizer PR rotates as the wavelength is changed to produce extinction while a test sample is located in the sample cell.

As is apparent from the graph $GM_1$ the zero or extinction value of the polarizer angle varies with wavelength as a function of time, even when no sample is present. Such variations have their origin in residual birefringence that exists in the path of the polarized light because of the strain in various glass surfaces or other optical elements and because of imperfections in the polarizer and the analyzer. The variations in the zero settings of the polarizer from one wavelength to another causes errors in the readings when a test sample is being analyzed.

According to this invention, these errors are made reproducible from one recording to another by virtue of the fact that the width of the exit slit SX is varied as a predetermined function of wavelength and thus has the same value of wavelength each time the monochromator projects radiation of that wavelength into the polarization unit P.

In order to ascertain the amount of optical activity of the sample at different wavelengths the readings represented by the graph $GM_1$ are subtracted from corresponding readings of the graph $GM_2$ at each of the wavelengths.

It is thus seen that by this invention an improved spectropolarimeter has been provided in which the light grasp of a monochromator is varied as a predetermined function of wavelength during the production of a spectropolarogram. It will, of course, be understood that the invention has application even when a spectropolarogram is not being made, such as for example, when measurements of the optical rotation are successively measured at specific wavelengths one at a time. Such measurements at various specific wavelengths may for example be made by driving a counter CT from the output shaft of the servomotor SM and noting the wavelength. The invention may be employed not only to measure the natural optical activity of specimens, but also optical activity that may be induced therein by application of either magnetic or electric fields thereto. Furthermore, while the invention has been described with particular reference to a mechanism for varying the light grasp by manipulating the jaws of the slits of a monochromator during the scanning of the spectrum, it will be understood that the light grasp may be varied in other ways. It will therefore be understood that the invention is not limited to the specific embodiment thereof that has been described, nor to the specific application thereof that has been described in detail.

The invention claimed is:

1. In a spectropolarimeter, the combination of:
monochromatizing means for projecting a beam of monochromatic radiation as polarized light through a sample to means, including a photodetector, that is selectively responsive to a predetermined component of polarized light,
said monochromatizing means including dispersing means for establishing the wavelength of such projected radiation and also including beam-limiting means for defining the distribution of the projected monochromatic beam;
scanning means coupled to said dispersing means for varying the wavelength of the projected monochromatic beam; and
means coupled to said scanning means and said beam-limiting means for adjusting said beam-limiting means to vary the distribution of the projected beam as a predetermined and reproducible function of the wavelength of said projected beam independently of the presence or absence of such sample whereby any variation of the polarization of the beam caused by a variation of the distribution is reproduced in successive scans of the spectrum.

2. In a spectropolarimeter, the combination of:
a polarimeter section comprising means for transmitting polarized light through a sample to means, including a photodetector that is selectively responsive to a predetermined component of polarized light;
a monochromator having an exit slit and including monochromatizing means for projecting a beam of monochromatic radiation through said exit slit for such transmission,
said monochromatizing means including dispersing means for establishing the wavelength of such projected radiation and also including beam-limiting means for defining the distribution of the projected monochromatic beam;
scanning means coupled to said dispersing means for varying the wavelength of said projected beam independently of the presence or absence of such sample in the projected monochromatic beam; and means coupled to said scanning means and to said beam limiting means for adjusting said beam-limiting means to vary the distribution of the projected monochromatic beam as a predetermined and reproducible function of its wavelength whereby any variation of the polarization of the projected beam caused by a variation of the distribution is reproduced in successive scans of the spectrum.

3. A spectropolarimeter as defined in claim 1 including:

a polarization sensitive device for modifying the polarization properties of the projected beam, in accordance with a condition of said device; and means controlled by said photodetector for altering said condition to counteract a change in the polarization induced by said sample in said projected beam.

4. In a spectropolarimeter, the combination of:

a polarimeter section comprising means for transmitting polarized light through a sample and an analyzer to a photodetector;

a monochromator having an exit slit having a width defined by two relatively movable slit jaws and also including monochromatizing means for projecting a beam of monochromatic radiation through said exit slit for such transmission, said monochromatizing means including rotatable dispersing means for establishing the wavelength of such projected radiation through said exit slit and also including beam-limiting means that cooperate with said exit slit to define the distribution of the projected monochromatic beam;

scanning means coupled to said dispersing means for rotating said dispersing means to vary the wavelength of the projected monochromatic beam; and means coupled to said scanning means and said exit slit jaws for adjusting the spacing between said slit jaws to vary the width of the exit slit as a predetermined and reproducible function of the wavelength of the projected beam independently of the presence or absence of such sample whereby any variation of the polarization of the beam caused by a variation of the distribution is reproduced in successive scans of the spectrum.

5. A spectropolarimeter as defined in claim 4 including:

a rotatable polarizer for rotating the plane of polarization of polarized light transmitted through said sample; and means controlled by said photodetector for rotating said polarizer to compensate for rotation of the plane of polarization produced by said sample.

6. In an instrument for measuring the effect of a sample on polarized light, the combination of:

beam-projecting means including a monochromator for projecting a polarized light beam to a sample whereby the polarization of the beam may be altered by the sample and from the sample to polarization sensitive means, including a photodetector, that is selectively responsive to a predetermined component of polarized light, said beam being projected along a light path that includes at least one element that intercepts the beam and modifies the polarization of the intercepted beam in accordance with the distribution of the beam at the element, the light reaching said photodetector being monochromatic, means for altering the transmission of the projected beam in such a manner that the distribution of the projected beam on said element also is altered, whereby the polarization of the detected beam depends in part on properties of the sample and partly on the transmission of the beam;

scanning means acting in conjunction with said monochromator for varying the wavelength of the projected monochromatic beam to scan the spectrum; and means coupled to said monochromator for adjusting said beam-altering means to vary the transmission of the projected beam as a predetermined and reproducible function of the wavelength of the projected beam independently of the presence or absence of said sample.

7. In a spectropolarimeter as defined in claim 6:

a device for modifying the polarization properties of the projected beam in accordance with a condition of said device; and means controlled by said photodetector for altering said condition to counteract a change in the polarization produced by said sample in said projected beam.

8. In a spectropolarimeter as defined in claim 7:

means for measuring a change in such condition to indicate the change in polarization produced by said sample.

9. In a spectropolarimeter as defined in claim 6:

a device for modifying the polarization properties of the projected beam in accordance with a condition of said device;

means controlled by said photodetector for developing an electric current in accordance with departure of said beam from an extinction condition at said polarization sensitive means;

means controlled by said current for altering said condition to counteract a change in the polarization produced by said sample in said projected beam; and means controlled by the photodetector for indicating the amount of modification of polarization produced by said device and hence the change in polarization produced by said sample.

10. In an instrument for measuring the effect of a sample on polarized light, which instrument includes:

polarization-sensitive means, comprising a photodetector, responsive to radiation in a predetermined condition of polarization, beam-projecting means for polarizing radiation and for projecting the polarized radiation to a sample and thence to said polarization-sensitive means whereby said photodetector receives part of the projected radiation that is in said predetermined condition, said beam-projecting means comprising a monochromator having dispersing means for establishing the mean wavelength of monochromatic radiation projected to said photodetector and having an aperture having an adjustable dimension for varying the amount of radiation projected to said photodetector, the proportion of the projected beam that is in said predetermined condition being dependent upon said dimension, the improvement comprising:

adjusting means for adjusting said aperture dimension whereby the polarization of the radiation depends in part on said dimension and in part on the sample;

scanning means coupled to said dispersing element for varying the mean wavelength of said monochromatic radiation to scan a spectrum; and means coupled to said scanning means and to said adjusting means for adjusting the dimension of said aperture to vary the transmission of the projected radiation as a predetermined and reproducible function of the wavelength of the monochromatic radiation independently of the pressure or absence of such sample as the spectrum is scanned.

11. In a spectropolarimeter as defined in claim 10:

a device for modifying the polarization properties of the projected radiation in accordance with a condition of said device; and means controlled by said photodetector for altering said condition to counteract a change in the polarization produced by said sample in said projected radiation.

12. In an instrument for measuring the effect of a sample on polarized light:
  a monochromator having entrance and exit slits of adjustable width and also having dispersing means for establishing the mean wavelength of monochromatic radiation projected from the entrance slit through the exit slit;
  polarization-sensitive means comprising a photodetector for receiving radiation projected through said exit slit, said polarization-sensitive means being responsive to received radiation that is in a predetermined condition of polarization;
  means for polarizing said monochromatic radiation and for projecting the polarized radiation to a sample that effects the polarization of the radiation and for projecting the affected radiation to said photodetector whereby said polarization-sensitive means responds to the part of the affected radiation that is in such predetermined condition;
  the polarization of the projected radiation being dependend upon the widths of said adjustable slits as well as upon the sample;
  slit-adjusting means for adjusting the widths of said slits whereby the transmission of the received radiation that is projected from said entrance slit to said exit slit is changed and the polarization of the detected radiation depends in part on the widths of the slits and in part on the sample;
  scanning means coupled to said dispersing means for varying the mean wavelength of said monochromatic radiation to scan a spectrum; and
  means coupled to said scanning means and to said slit-adjsuting means for simultaneously adjusting the widths of both slits as a predetermined and reproducible function of said mean wavelength independently of the presence or absence of said sample as the spectrum is scanned.

13. In an instrument for measuring the effect of a sample in rotating the plane of polarization of a plane polarized light beam:
  a monochromator having the entrance and exit slits of adjustable width and also having dispersing means for establishing the mean wavelength of monochromatic radiation projected from the entrance slit through the exit slit;
  polarization-sensitive means, comprising a photodetector, for receiving radiation projected through said exit slit, said polarization-sensitive means being responsive to receive radiation that lies in a predetermined plane of polarization;
  means for polarizing said monochromatic radiation in a plane and for projecting the plane-polarized radiation to a sample that rotates the plane of polarization and for then projecting the radiation to said photodetector whereby said polarization-sensitive means responds to the component of the rotated radiation that lies in a predetermined plane of polarization;
  the plane of polarization of the projected radiation being dependent upon the widths of said adjustable slits as well as upon the sample;
  slit-adjusting means for adjusting the widths of said slits whereby the transmission of the received radiation that is projected from said entrance slit to said exit slit is changed and the rotation of the plane of polarization of the detected radiation depends in part on the widths of the slits and in part on the sample;
  scanning means coupled to said dispersing means for varying the mean wavelength of said monochromatic radiation to scan a spectrum; and
  means coupled to said scanning means and said slit-adjusting means for adjusting the widths of said slits as a predetermined and reproducible function of said mean wavelength as the spectrum is scanned.

14. In an instrument as defined in claim 13,
  compensating means for rotating the plane of polarization of the plane polarized beam;
  means controlled by said photodetector and acting on said compensating means to rotate the plane of polarization to oppose rotation produced by said sample; and
  means for indicating the extent of rotation introduced by said compensating means.

References Cited
UNITED STATES PATENTS

| | | | |
|---|---|---|---|
| 2,587,451 | 2/1952 | Farrand | 88—14 |
| 2,654,287 | 10/1953 | Luft | 88—14 |
| 2,660,086 | 11/1953 | Foreman et al. | 88—14 |
| 2,768,306 | 10/1956 | Grubb et al. | 250—43.5 |
| 2,813,451 | 11/1957 | Stickney | 250—43.5X |
| 2,933,972 | 4/1960 | Wenking | 88—14 |
| 3,098,408 | 7/1963 | Cary | 88—14 |
| 3,155,762 | 11/1964 | Gillham et al. | 88—14 |
| 3,164,662 | 1/1965 | Grosjean et al. | 356—97 |

RONALD L. WIBERT, Primary Examiner

F. L. EVANS, Assistant Examiner

U.S. Cl. X.R.

250—225; 350—151; 356—117